(12) United States Patent
Canterbury et al.

(10) Patent No.: US 8,161,809 B2
(45) Date of Patent: *Apr. 24, 2012

(54) BRAKE WEAR MEASUREMENT APPARATUS AND METHOD

(75) Inventors: Tracey A. Canterbury, Union, OH (US); Joe B. Norsworthy, Crestwood, KY (US)

(73) Assignee: Goodrich Corporation, Charlotte, NC (US)

( * ) Notice: Subject to any disclaimer, the term of this patent is extended or adjusted under 35 U.S.C. 154(b) by 253 days.

This patent is subject to a terminal disclaimer.

(21) Appl. No.: 12/466,953

(22) Filed: May 15, 2009

(65) Prior Publication Data

US 2009/0217748 A1  Sep. 3, 2009

Related U.S. Application Data

(63) Continuation of application No. 11/796,758, filed on Apr. 30, 2007, now Pat. No. 7,552,627.

(60) Provisional application No. 60/796,950, filed on May 1, 2006.

(51) Int. Cl.
*G01M 17/007* (2006.01)

(52) U.S. Cl. ........................................... 73/121

(58) Field of Classification Search ............... 73/121, 73/127, 128, 129, 132

See application file for complete search history.

(56) References Cited

U.S. PATENT DOCUMENTS

| 4,658,936 | A  | * | 4/1987  | Moseley ................ 188/1.11 R |
| 5,035,303 | A  | * | 7/1991  | Sullivan ................. 188/1.11 W |
| 5,697,472 | A  | * | 12/1997 | Walker et al. .......... 188/1.11 W |
| 6,076,639 | A  | * | 6/2000  | Dahlen et al. .......... 188/1.11 R |
| 6,237,723 | B1 | * | 5/2001  | Salsman ................ 188/1.11 W |
| 6,460,659 | B1 | * | 10/2002 | Schaffer et al. ........ 188/1.11 W |
| 6,637,262 | B2 | * | 10/2003 | Chang et al. .................. 188/11 |
| 2003/0084714 | A1 | * | 5/2003 | Chang et al. .................. 73/121 |

* cited by examiner

*Primary Examiner* — Eric S McCall
(74) *Attorney, Agent, or Firm* — Snell & Wilmer L.L.P.

(57) ABSTRACT

A brake wear measurement apparatus for use on a brake assembly equipped with a wear pin having a plunger slidably mounted in the plunger sleeve having a first end and second end and wherein when the brake wear measurement apparatus is placed over the wear pin, the wear pin contacts the plunger first end, and moves the plunger within the plunger sleeve to a retracted position corresponding to a retraction distance delta, and wherein the retraction distance delta corresponds to a wear pin exposed height indicating an amount of brake wear. A locking mechanism for locking the plunger in the retracted position may be provided. A brake wear correlation program whereby the input of a brake part number, a plunger retraction distance delta, and a number of performed landings will result in an output of an estimated number of remaining landings may also be provided.

15 Claims, 7 Drawing Sheets

BRAKE WEAR MEASUREMENT APPARATUS AND METHOD

CROSS-REFERENCE TO RELATED APPLICATIONS

This application is a continuation application of U.S. patent application Ser. No. 11/796,758, now U.S. Pat. No. 7,552,627, filed Apr. 30, 2007, entitled BRAKE WEAR MEASUREMENT APPARATUS AND METHOD, which claims priority to U.S. Provisional Patent Application Ser. No. 60/796,950 filed May 1, 2006, entitled BRAKE WEAR MEASUREMENT APPARATUS AND METHOD, all of which is hereby incorporated by reference in their entirety.

FIELD OF INVENTION

This invention generally relates to braking systems, and more particularly, to an apparatus and method for measuring the wear of aircraft brakes.

BACKGROUND OF THE INVENTION

Presently aircraft brakes typically are manufactured with a wear pin. This pin is used to indicate the wear of the brakes. On larger aircraft, when the wear pin is no longer protruding from its indicator hole, the brakes are ready for replacement. However, on smaller aircraft, where the wear on each landing is less, even a small amount of wear pin remaining can be a significant amount of remaining landings.

However, because these brakes are not checked after every landing, and an approximate number of remaining landings may not be known, often a decision is made to remove these brakes from the aircraft when there is a small amount of wear pin still showing. Often the practice has been to remove the brakes from the aircraft to get an accurate measurement of the remaining wear pin, to better determine the remaining number of landings. Once an accurate measurement of the wear pin is obtained, the original size of the wear pin is determined by looking up the part number. The difference between the original size and the current size is then divided by the number of landings to give an approximate "wear-per-landing", and this is then used to estimate the number of remaining landings. Because of the time and complexity of this process, it is usually not performed on site, and sometimes the brake is discarded with remaining landings left.

Accordingly, a need exists for an apparatus and method which allows measurement of the wear pin without removal of the brake from the aircraft. It is further desired to have a program which would allow for easy calculation of the remaining landings based on the measurement of the wear pin.

SUMMARY OF THE INVENTION

Embodiments of the disclosed apparatus, systems and methods described herein are directed to a brake wear measurement apparatus for use on a brake assembly equipped with a wear pin having a diameter and an exposed height, which comprises a plunger sleeve having a first end and a second end, and an inner diameter larger than the wear pin outer diameter.

The brake wear measurement apparatus may further comprise a plunger slidably mounted in the plunger sleeve having a corresponding first end and second end and wherein the plunger first end is exposed, such that when the brake wear measurement apparatus is placed over the wear pin, the wear pin contacts the plunger first end, and moves the plunger within said plunger sleeve a retraction distance delta, which corresponds to the wear pin exposed height.

In an embodiment, the brake wear measurement apparatus may further comprise a plunger stop mechanism to prevent the plunger from sliding out of the plunger sleeve when no external force is applied to the plunger.

In an embodiment, the brake wear measurement apparatus may further comprise a locking mechanism configured to prevent the plunger from sliding within the plunger sleeve when said locking mechanism is engaged. The apparatus may further comprise a brake wear correlation program whereby the input of a brake part number, a plunger retraction distance delta, and a number of performed landings will result in an output of an estimated number of remaining landings.

DETAILED DESCRIPTION

The detailed description of various embodiments herein makes reference to the accompanying drawing figures, which show various embodiments and implementations thereof by way of illustration and its best mode, and not of limitation. While these embodiments are described in sufficient detail to enable those skilled in the art to practice the embodiments, it should be understood that other embodiments may be realized and that logical, electrical, and mechanical changes may be made without departing from the spirit and scope of the invention. Furthermore, any reference to singular includes plural embodiments, and any reference to more than one component or step may include a singular embodiment or step.

Also, any reference to attached, fixed, connected or the like may include permanent, removable, temporary, partial, full and/or any other possible attachment option. Additionally, any reference to without contact (or similar phrases) may also include reduced contact or minimal contact. Finally, though the various embodiments discussed herein may be carried out in the context of an aircraft, it should be understood that systems and methods disclosed herein may be incorporated into anything needing a brake, or into any vehicle such as, for example, an aircraft, a train, a bus, an automobile and the like.

Various aspects of the invention are presented in FIGS. 1-10 which are not drawn to scale and in which like components are numbered alike. With reference to these figures, in an embodiment, a brake wear measurement apparatus 10 for use on a brake assembly 5 configured with a wear pin 11 having a diameter 12, and an exposed height 13, may comprise a plunger sleeve 20, a plunger 30, a plunger stop 60, a plunger spring 40, and a locking mechanism 50.

In an embodiment, the plunger sleeve 20 has a first end 22 and a second end 24, wherein the second end 24 may have a spring stop, which, in an embodiment may comprise a spring sleeve 27. The plunger sleeve first end 22 has an inner diameter 23, wherein the plunger sleeve first end inner diameter 23 is greater than the wear pin diameter 12.

In an embodiment, the plunger 30 may comprise a first end 32 and a second end 34. The plunger 30 may be slidably mounted in the plunger sleeve 20. When the plunger 30 is mounted in the plunger sleeve 20, the plunger first end 32 is exposed, such that when the brake wear measurement apparatus 10 is placed over the wear pin 11, the wear pin 11 contacts the plunger first end 32, and moves the plunger 30 within the plunger sleeve 20 a retraction distance delta 36 within the plunger sleeve 20. The retraction distance delta 36 corresponds to the wear pin exposed height 13. In an embodiment, the plunger stop 60 prevents the plunger 30 from exiting the plunger sleeve 20.

Figure 4:
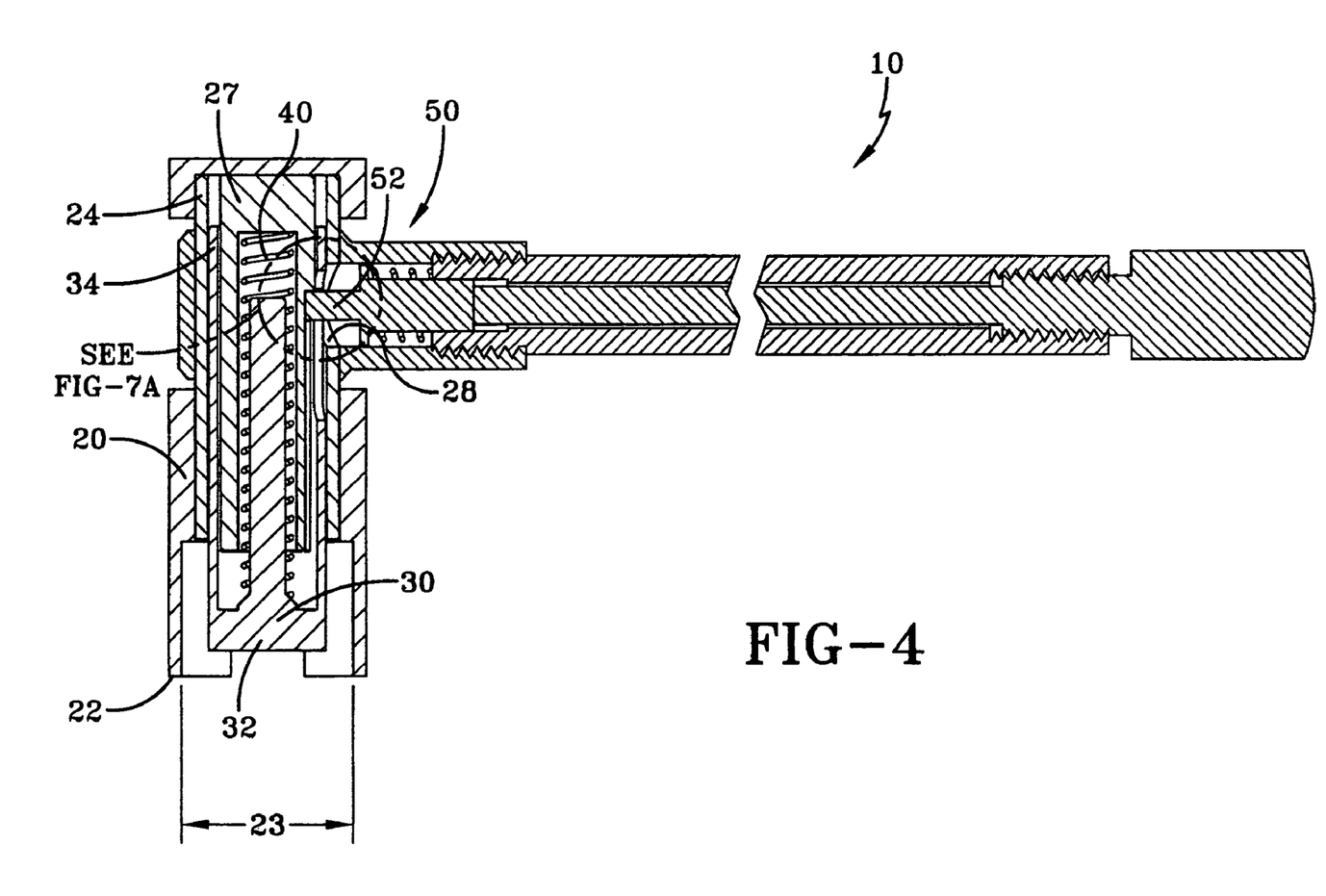
FIG. 4 is a cross sectional view, from FIG. 2, of a brake wear measurement apparatus in accordance with an embodiment.
Figure 5:
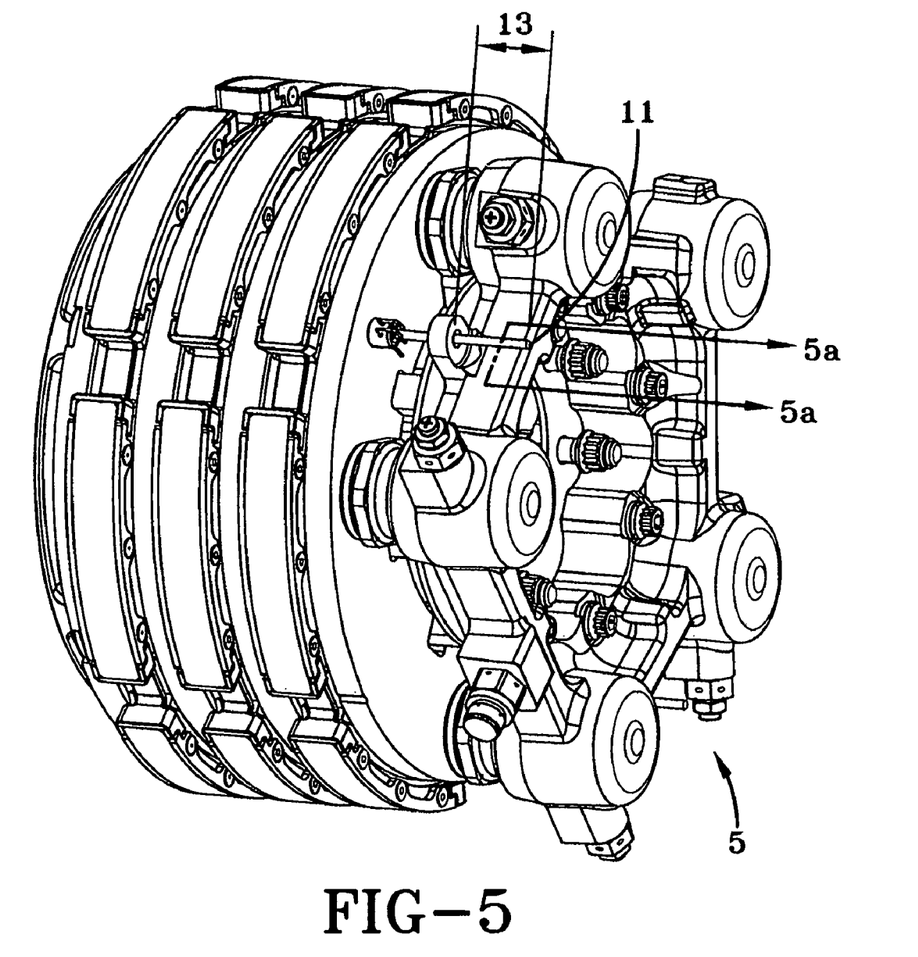
FIG. 5 is a cut-away view of a brake assembly, showing a wear pin in accordance with an embodiment.
Figure 5A:
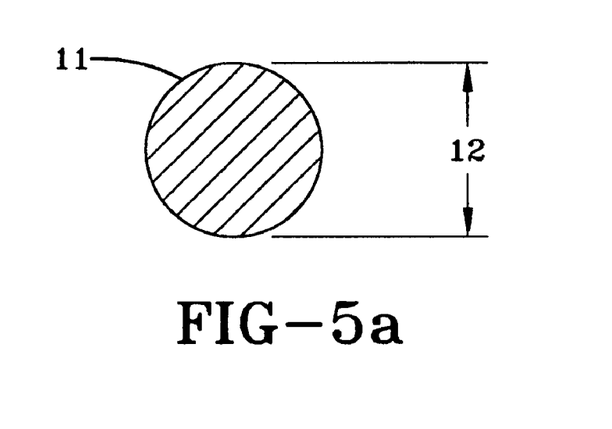
FIG. 5A is a cross sectional view of the wear pin from FIG. 5.

In an embodiment, a plunger spring 40 may be mounted in the plunger sleeve against the spring stop. In an embodiment where the spring stop comprises a spring sleeve 27, the spring 40 may be mounted in the spring sleeve 27. The plunger spring 40 acts on the plunger 30, such that when there are no other external forces on the plunger 30, the plunger spring 40 biases the plunger 30 against the plunger stop 60 such that the plunger first end 32 is flush with the plunger sleeve first end 22.

Figure 9:
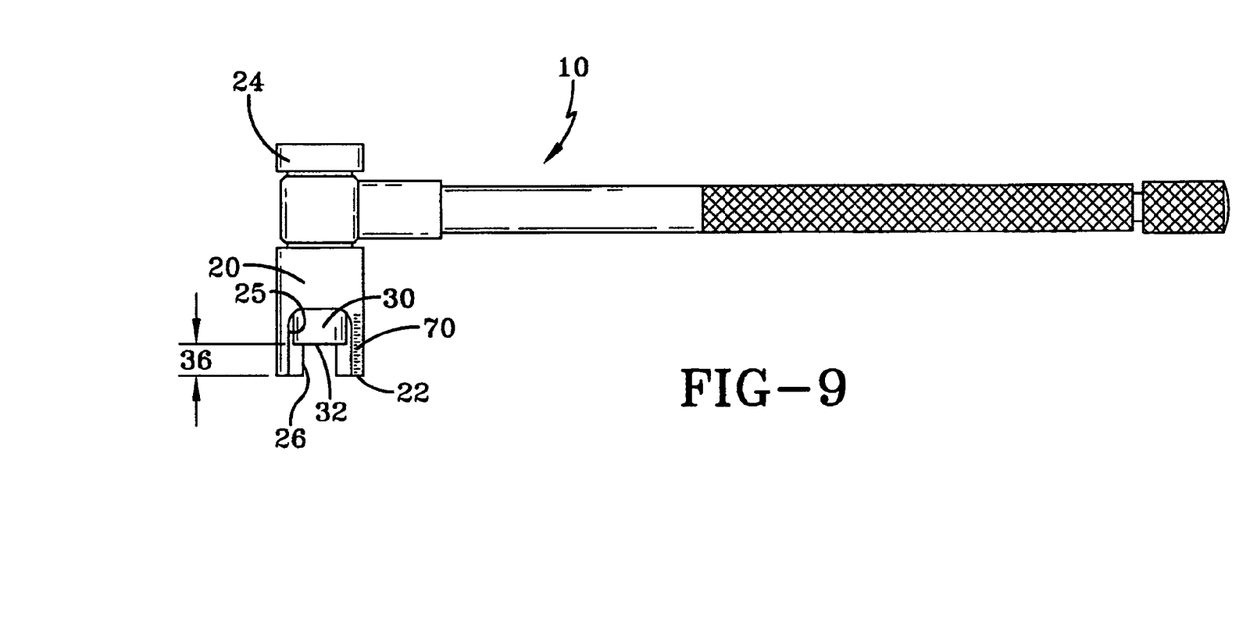
FIG. 9 is a side view of a brake wear measurement apparatus with a plunger locked in a retracted position in accordance with an embodiment.

In an embodiment, the locking mechanism 50 may be configured such that when a force is applied to the plunger first end 32, compressing the plunger spring 40 and forcing the plunger 30 to retract within the plunger sleeve 20, the locking mechanism 50 may be engaged to maintain the plunger 30 in such retracted position.

Figure 1:
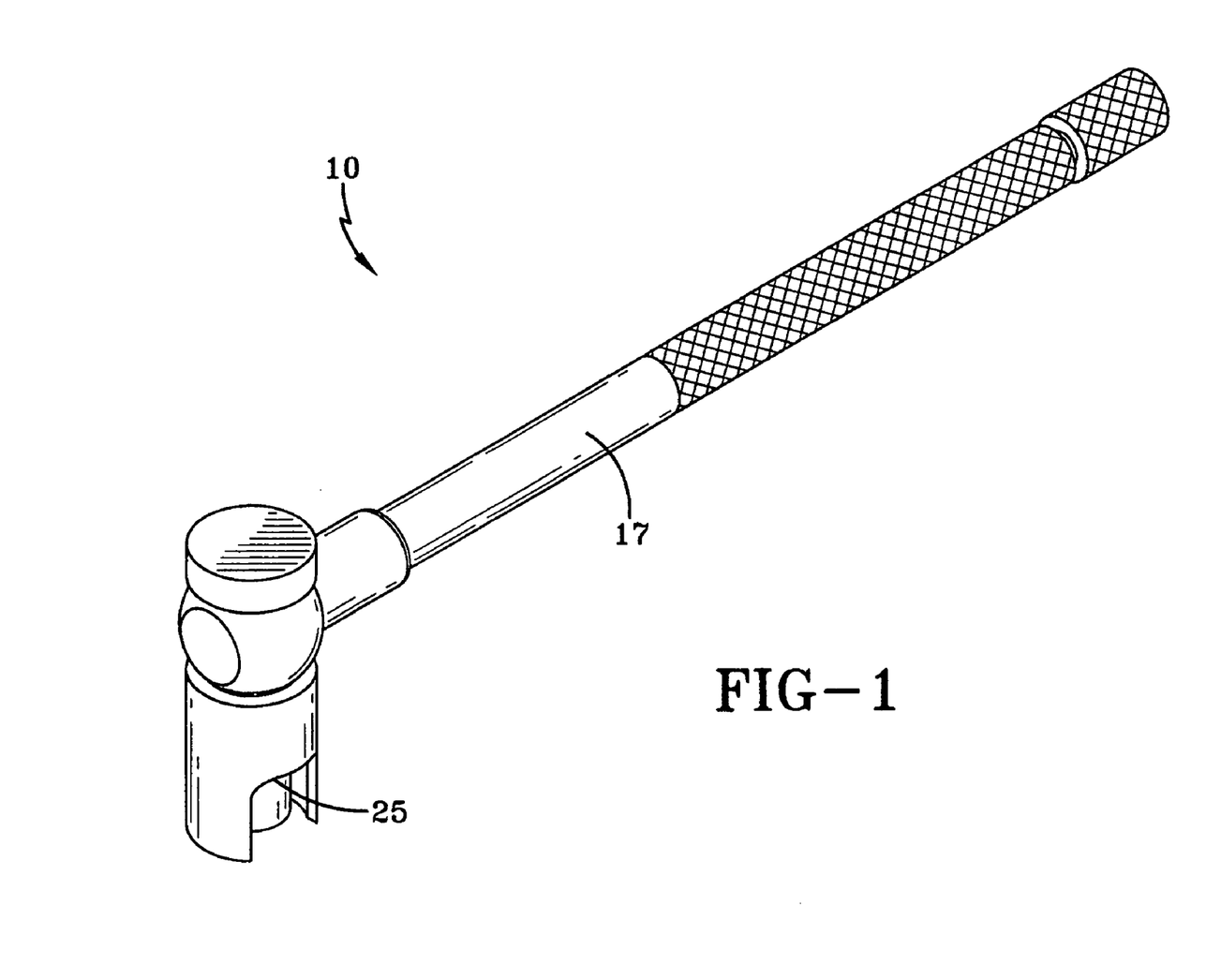
FIG. 1 is an isometric view of a brake wear measurement apparatus in accordance with an embodiment.
Figure 2:
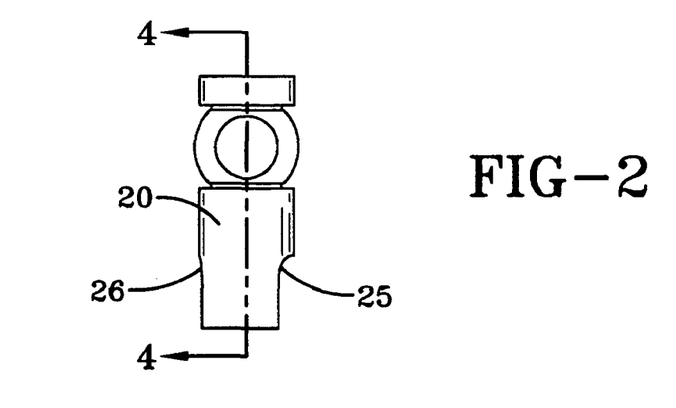
FIG. 2 is an end view of a brake wear measurement apparatus in accordance with an embodiment.
Figure 3:
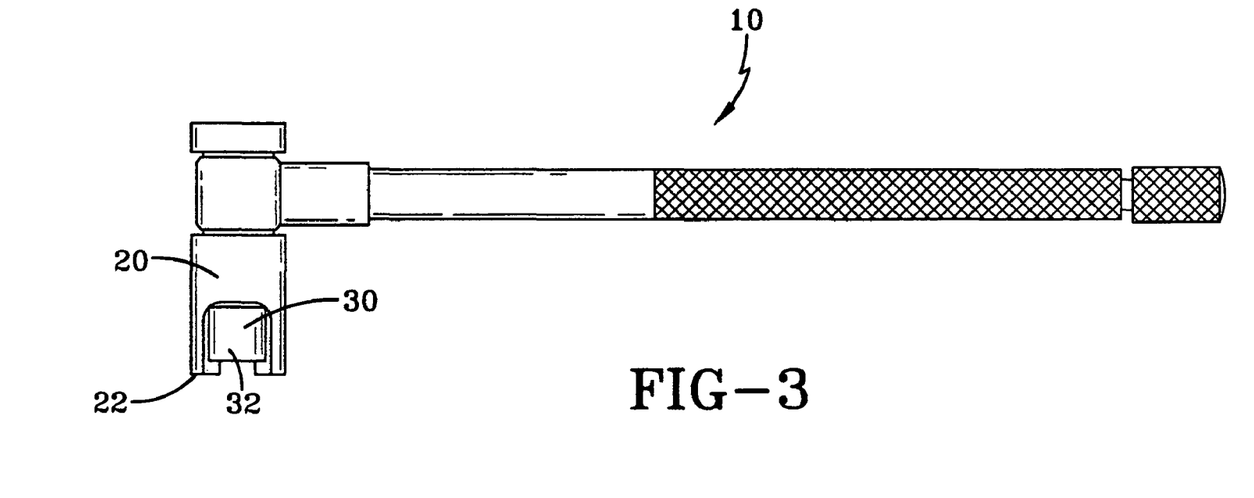
FIG. 3 is a side view of a brake wear measurement apparatus in accordance with an embodiment.

In an embodiment, the plunger sleeve first end 22 may have at least one cut out area 25, such that a portion of the plunger first end 32 is exposed, even when the plunger 30 is retracted. The cut out area 25 may be configured to provide clearance so that the brake wear measurement apparatus 10 can fit over wear pin 11 without interference from other components of the brake assembly. According to another embodiment, the plunger sleeve first end 22 may have a second cut out 26. The second cut out 26 may provide visible confirmation of proper tool use and/or provide clearance, for example, to prevent interference with the piston housing during use.

In another embodiment, measurement gradients 70 may be provided on the outside of the plunger sleeve first end 22, for example, proximate the cut-out area 25 such that the retraction distance 36 of the plunger 30 can be determined without the use of another measuring tool.

According to another embodiment, the brake wear measurement apparatus 10 further comprises a handle 17 extending from the plunger sleeve 20.

In an embodiment, the locking mechanism 50 may comprises a hole 28 in the plunger sleeve second end 24, wherein the hole 28 exposes a portion of the plunger second end 34. The locking mechanism 50 may further comprise a locking pin 52 sized to fit into the hole 28, such that the locking pin 52 may be extended into the hole 28 against the plunger second end 34 with a force sufficient to prevent the plunger 30 from moving. In an embodiment, the locking pin 52 is located within the handle 17.

Figure 6:
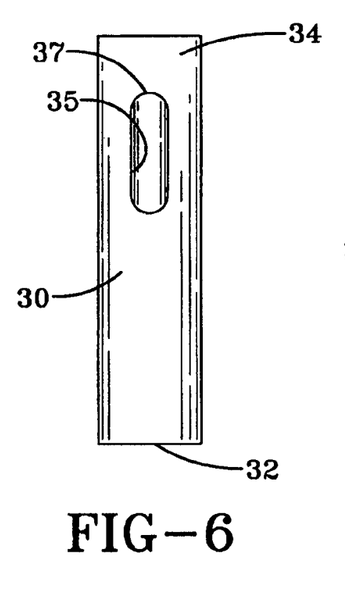
FIG. 6 is a side view of a plunger in accordance with an embodiment.
Figure 7:
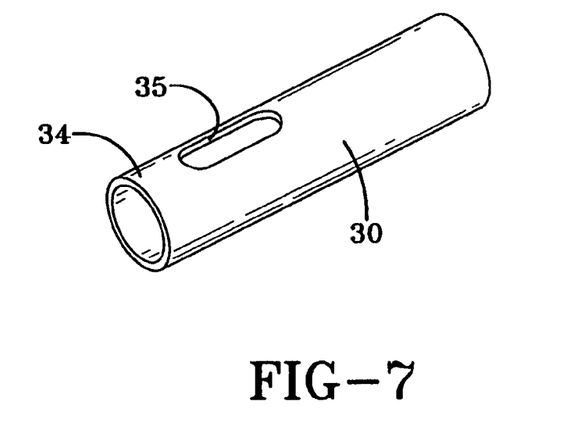
FIG. 7 is an isometric view of a plunger in accordance with an embodiment.
Figure 7A:
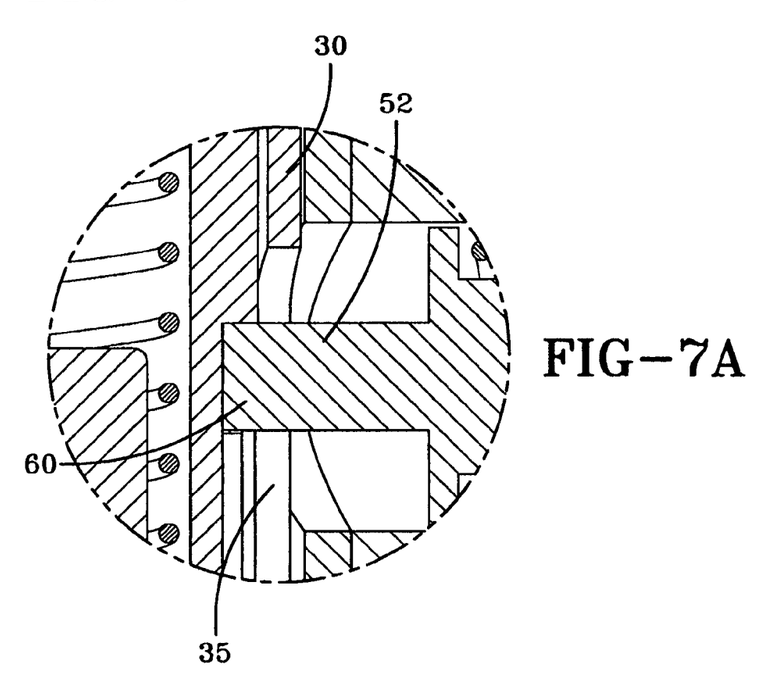
FIG. 7A is a cut out from FIG. 4 showing a close-up of a plunger stop in accordance with an embodiment.

In an embodiment, the plunger 30 may comprise a slot 35 which lines up with the plunger sleeve hole 28 such that the locking pin 52 fits into the plunger slot 35. This combination can be used as the plunger stop 60 where the slot 35 has a top end 37 such that when the locking pin 52 is at the slot top end 37, the plunger first end 32 is flush with the plunger sleeve first end 22.

When an embodiment of the brake wear measurement apparatus is in use, the wear pin 11 will force the plunger 30 to retract away from the plunger sleeve first end 22. The distance that the plunger first end 32 retracts away from the plunger sleeve first end 22 is the plunger retraction distance 36.

Figure 8:
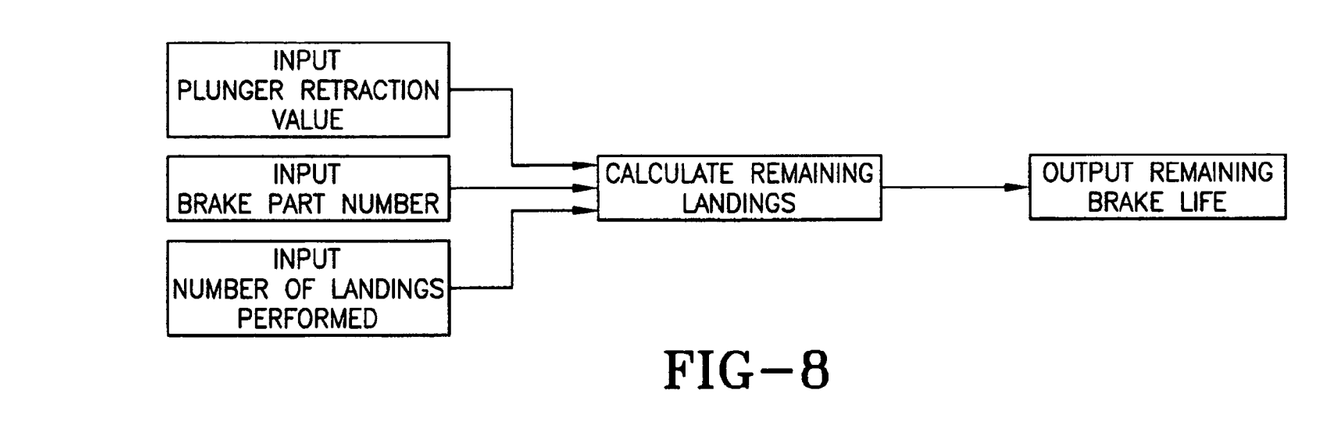
FIG. 8 is a flow chart of a brake wear correlation program in accordance with an embodiment.

In various embodiments, a brake wear correlation program may be provided whereby the input of a brake part number, a plunger retraction distance 36, and a number of performed landings will result in an output of an estimated number of remaining landings. This program contains data for the wear pin size for the different part numbers, and will perform all the calculations.

According to an embodiment, a method for determining remaining brake life for a brake assembly 5 equipped with a wear pin 11 comprises the steps of placing the brake measurement tool 10 over the wear pin 11, such that the wear pin 11 slides into the plunger sleeve 20, forcing the plunger 30 to retract; locking the plunger 30 in the retracted position with the locking mechanism 50; removing the brake measurement tool 10 from the wear pin 11; measuring the plunger retraction distance 36 by measuring the distance between the plunger first end 32 in the retracted position, and the plunger sleeve first end 22; and, inputting the plunger retraction distance 36 into a brake wear correlation program whereby the input of a brake part number, a plunger retraction distance 36, and a number of performed landings will result in an output of an estimated number of remaining landings.

Figure 10:
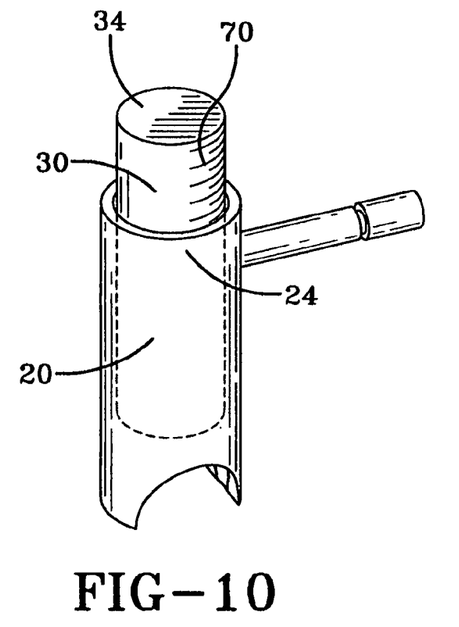
FIG. 10 is an isometric view of a brake wear measurement apparatus in accordance with an embodiment.
Figure 11:
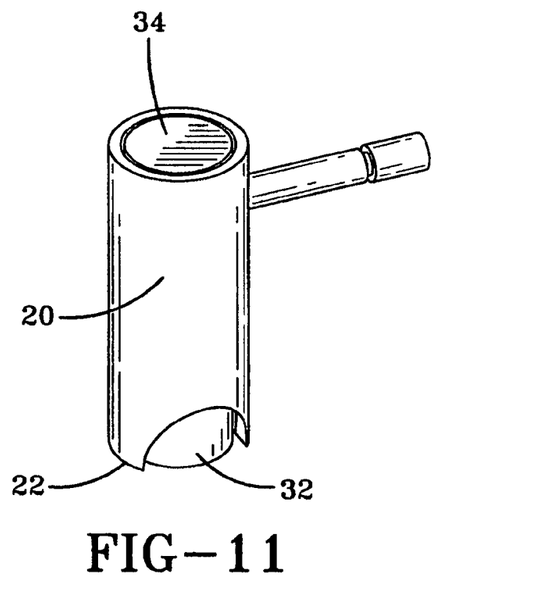
FIG. 11 is an isometric view of a brake wear measurement apparatus in accordance with an embodiment.
Figure 12:
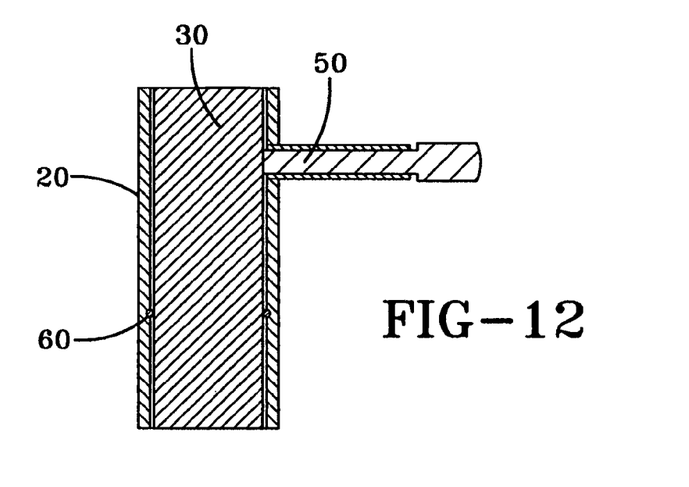
FIG. 12 is a cross-sectional view of a brake wear measurement apparatus in accordance with an embodiment.

Another embodiment of the brake wear measurement device is shown in FIGS. 10-12. In this embodiment, the plunger sleeve 20 comprises a first end 22 and a second end 24 and further has an inner diameter 23, wherein the inner diameter 23 is larger than the wear pin diameter 12. A plunger 30 is slidably mounted in the plunger sleeve 20, and has a corresponding plunger first end 32 and plunger second end 34.

The brake wear measurement apparatus may further comprise a plunger stop mechanism 60 configured to prevent the plunger 32 from sliding out of the plunger sleeve 20 when no external force is applied to the plunger 30.

In an embodiment, a locking mechanism 50 may be provided to prevent the plunger 30 from sliding within the plunger sleeve 20 when the locking mechanism 50 is engaged.

In an embodiment, the plunger sleeve first end 22 may further comprise a cut out 25, such that the plunger first end 32 is visible. The cut out 25 may have gradient markings to measure the movement of the plunger 30.

In an embodiment, the plunger sleeve second end 24 may be open to allow the plunger second end 34 to extend. The plunger second end 34 may further comprise gradient markings 70 to measure the movement of the plunger 30. In various embodiments, the gradient markings correlate to the delta between the plunger first end 32 and the plunger sleeve first end 22, and thus to wear pin exposed height 13.

In an embodiment, the plunger stop mechanism 60 may comprise a friction fitted o-ring. The friction fitted o-ring may act as either or both of the plunger stop mechanism 60 and the locking mechanism 50.

Finally, although the invention has been shown and described with respect to certain embodiments, equivalents and modifications will occur to others who are skilled in the art upon reading and understanding of the specification. Various embodiments include all such equivalents and modifications, and are limited only by the scope of the following claims.

Additionally, benefits, other advantages, and solutions to problems have been described herein with regard to various embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. A brake wear measurement apparatus for use on a brake assembly equipped with a wear pin, comprising:
    a plunger sleeve having a plunger sleeve first end and a plunger sleeve second end, wherein said plunger sleeve first end is configured to fit over the wear pin;
    a plunger having a plunger first end and a plunger second end, wherein said plunger is slidably mounted in said plunger sleeve, and wherein said plunger first end is disposed such that, when the brake wear measurement apparatus is placed over the wear pin, the wear pin contacts said plunger first end, and moves said plunger within said plunger sleeve to a retracted position;
    a locking mechanism configured to lock said plunger in said retracted position; and
    a handle extending from said plunger sleeve.

2. The brake wear measurement apparatus of claim 1:
    wherein said locking mechanism further comprises a hole in said plunger sleeve second end, wherein said hole exposes a portion of said plunger; and
    a locking pin sized to fit into said hole, such that said locking pin may be extended into said hole to engage said plunger and lock said plunger in said retracted position.

3. The brake wear measurement apparatus of claim 1, wherein said locking mechanism is located within said handle.

4. The brake wear measurement apparatus of claim 1, wherein said plunger sleeve first end further comprises a cut out area.

5. The brake wear measurement apparatus of claim 1, wherein said plunger sleeve further comprises gradient markings for determining a wear pin exposed height based on said retracted position.

6. The brake wear measurement apparatus of claim 1, further comprising a plunger spring configured to bias said plunger toward said plunger sleeve first end.

7. The brake wear measurement apparatus of claim 6, further comprising a spring stop attached to said plunger sleeve.

8. The brake wear measurement apparatus of claim 1, further comprising a plunger stop attached to said plunger sleeve.

9. The brake wear measurement apparatus of claim 8, wherein said plunger stop mechanism is an o-ring.

10. The brake wear measurement apparatus of claim 9, wherein said o-ring is also said locking mechanism.

11. A brake wear measurement apparatus for use on a brake assembly equipped with a wear pin, comprising:
    a plunger sleeve having a plunger sleeve first end and a plunger sleeve second end, and wherein said plunger sleeve first end is configured to fit over the wear pin;
    a plunger slidably mounted in said plunger sleeve, wherein said plunger has a corresponding plunger first end and plunger second end, and wherein said plunger first end is disposed such that when said brake wear measurement apparatus is placed over the wear pin, the wear pin contacts said plunger first end, and moves said plunger within said plunger sleeve a retraction distance delta, wherein said retraction distance delta corresponds to the wear pin exposed height;
    a plunger stop mechanism, which prevents said plunger from sliding out of said plunger sleeve when no external force is applied to said plunger; and
    a locking mechanism which acts to prevent said plunger from sliding within said plunger sleeve when said locking mechanism is engaged,
    wherein said plunger sleeve further comprises gradient markings for determining a wear pin exposed height based on said retraction distance delta.

12. The brake wear measurement apparatus of claim 11, further comprising a cut out in said plunger sleeve first end.

13. The brake wear measurement apparatus of claim 11, wherein said plunger stop mechanism is an o-ring.

14. The brake wear measurement apparatus of claim 11, wherein said plunger stop mechanism is an o-ring, and wherein said o-ring is also said locking mechanism.

15. A brake wear measurement apparatus for use on a brake assembly equipped with a wear pin, comprising:
    a plunger sleeve having a plunger sleeve first end and a plunger sleeve second end, wherein said plunger sleeve first end is configured to fit over the wear pin;
    a plunger having a plunger first end and a plunger second end, wherein said plunger is slidably mounted in said plunger sleeve, and wherein said plunger first end is disposed such that, when the brake wear measurement apparatus is placed over the wear pin, the wear pin contacts said plunger first end, and moves said plunger within said plunger sleeve to a retracted position;

a locking mechanism configured to lock said plunger in said retracted position, wherein said locking mechanism further comprises a hole in said plunger sleeve second end, wherein said hole exposes a portion of said plunger; and a locking pin sized to fit into said hole, such that said locking pin may be extended into said hole to engage said plunger and lock said plunger in said retracted position.

* * * * *